(12) United States Patent
South

(10) Patent No.: US 9,216,349 B2
(45) Date of Patent: Dec. 22, 2015

(54) GRIPPING CONTROLLERS FOR PORTABLE COMPUTING DEVICES

(71) Applicant: Michael Paul South, Saint Paul, MN (US)

(72) Inventor: Michael Paul South, Saint Paul, MN (US)

( * ) Notice: Subject to any disclaimer, the term of this patent is extended or adjusted under 35 U.S.C. 154(b) by 121 days.

(21) Appl. No.: 13/857,538

(22) Filed: Apr. 5, 2013

(65) Prior Publication Data

US 2013/0267322 A1    Oct. 10, 2013

Related U.S. Application Data

(60) Provisional application No. 61/686,410, filed on Apr. 5, 2012, provisional application No. 61/782,544, filed on Mar. 14, 2013.

(51) Int. Cl.
| | |
|---|---|
| A63F 9/24 | (2006.01) |
| A63F 13/20 | (2014.01) |
| A63F 13/24 | (2014.01) |
| A63F 13/92 | (2014.01) |
| A63F 13/235 | (2014.01) |
| A63F 13/98 | (2014.01) |

(52) U.S. Cl.
CPC ............. *A63F 13/06* (2013.01); *A63F 13/235* (2014.09); *A63F 13/24* (2014.09); *A63F 13/92* (2014.09); *A63F 13/98* (2014.09)

(58) Field of Classification Search
CPC ......... A63F 13/02; A63F 13/06; A63F 13/08; A63F 2300/10; A63F 2300/204; G06F 1/1632; G06F 3/0202; G06F 3/0219; G06F 3/0489
See application file for complete search history.

(56) References Cited

U.S. PATENT DOCUMENTS

| | | | | |
|---|---|---|---|---|
| 6,119,991 | A * | 9/2000 | Thorne et al. ............. | 248/229.2 |
| 6,530,838 | B2 * | 3/2003 | Ha et al. ........................... | 463/36 |
| 7,224,345 | B2 * | 5/2007 | Kawell et al. ................ | 345/169 |
| 7,653,771 | B2 * | 1/2010 | Liberty ........................ | 710/303 |
| 2006/0252537 | A1 * | 11/2006 | Wu ................................. | 463/36 |
| 2006/0286943 | A1 * | 12/2006 | Vance et al. ................ | 455/90.1 |
| 2007/0050597 | A1 * | 3/2007 | Ikeda ................................ | 712/1 |
| 2009/0079705 | A1 * | 3/2009 | Sizelove et al. .............. | 345/173 |
| 2010/0081505 | A1 * | 4/2010 | Alten et al. .................... | 463/36 |
| 2011/0260969 | A1 | 10/2011 | Workman | |
| 2012/0113034 | A1 * | 5/2012 | McDermid ................... | 345/173 |
| 2013/0120258 | A1 * | 5/2013 | Maus ............................ | 345/161 |
| 2013/0157764 | A1 * | 6/2013 | Joynes ............................ | 463/37 |

* cited by examiner

*Primary Examiner* — James S McClellan
*Assistant Examiner* — Kevin Carter
(74) *Attorney, Agent, or Firm* — William Mitchell IP Clinic

(57) ABSTRACT

Various devices, systems, and methods for gripping controllers for use with portable computing devices are described herein. In various embodiments, a system for gripping controllers for use with portable computing devices includes two gripping controllers. Each gripping controller includes a top portion having a face with an input controller arranged to receive input from a user, a bottom portion coupled to the top portion, and a radio antenna. Each gripping controller clamps onto a side of the portable computing device. At least one gripping controller communicates the received input from one or both gripping controllers to the portable computing device via the radio antenna using a wireless communication protocol.

15 Claims, 10 Drawing Sheets

US 9,216,349 B2

GRIPPING CONTROLLERS FOR PORTABLE COMPUTING DEVICES

CLAIM OF PRIORITY

This patent application claims the benefit of priority, under 35 U.S.C. §119(e), to U.S. Provisional Patent Application Ser. No. 61/686,410, entitled "Split wireless game controller for smart phones, tablets, and media players," filed on Apr. 5, 2012, and to U.S. Provisional Patent Application Ser. No. 61/782,544, entitled "GRIPPING CONTROLLERS FOR PORTABLE COMPUTING DEVICES," filed on Mar. 14, 2013, the benefit of priority of each of which is claimed hereby, and each of which are incorporated by reference herein in its entirety.

TECHNICAL FIELD

Embodiments described herein generally relate to controllers for portable computing devices, and specifically to gripping controllers for portable computing devices.

BACKGROUND

In the last several years, portable computing devices such as smart phones and tablet computers have become ubiquitous. Some users use these portable computing devices for playing video games.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings, in which.

DESCRIPTION OF EMBODIMENTS

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments.

In the last several years, portable computing devices such as smart phones and tablet computers have become ubiquitous. Users use portable computing devices for many uses, including video games. Many video game players prefer to use analog hardware, such as joysticks, directional pads, or button pads, to play video games. Most portable computing devices do not have such analog hardware; consequently, video game players are forced to purchase individual analog hardware controls for use with the portable computing device. However, using such individual analog hardware with the portable computing device generally precludes the user from holding both the portable computing device and the analog hardware, further impeding the playing of video games in environments where the user cannot set down the portable computing device comfortably and safely. Thus, what is needed is a device that allows a user to play video games and hold the portable computing device at the same time.

Furthermore, most analog video game hardware is bulky and occupies a significant volume of space relative to the portable computing device, for which the analog video game hardware is used. Such hardware can be difficult to carry with the portable computing device, and can be difficult to travel with or store without fear of breaking the hardware. Thus, what is needed is a device that not only allows a user to play video games and hold the portable computing device at the same time, but also does not occupy a significant volume of space relative to the portable computing device, is easy to carry, and is easy to travel with or store. This disclosure describes such embodiments.

Figure 1A:
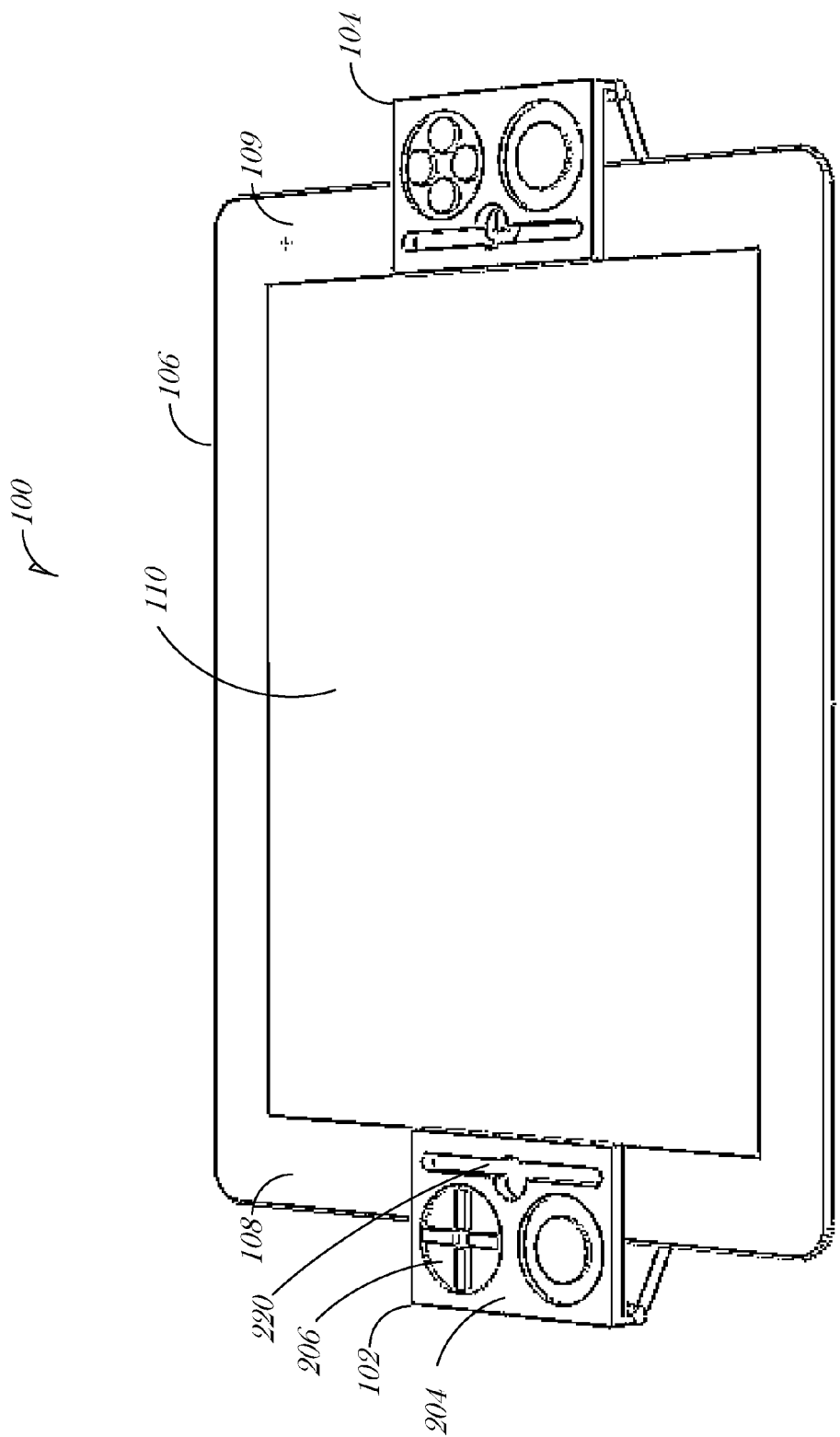
FIG. 1A is a perspective front view of a system for gripping controllers for portable computing devices, in accordance with some embodiments.

Turning to the figures, FIG. 1A is a perspective front view of a system 100 for gripping controllers for portable computing devices, in accordance with some embodiments. In various embodiments, the system 100 may include a first gripping controller 102 and a second gripping controller 104. The gripping controllers 102, 104 may be adapted for use with a portable computing device 106 that has a front and a back. In various embodiments, the portable computing device 106 may be a tablet computer, a smartphone, a laptop computer, a netbook computer, a notebook computer, a media player, etc.

Each gripping controller 102, 104 may include a top portion and a bottom portion coupled to the top portion. Each gripping controller 102, 104 may clamp onto a side 108, 109 of portable computing device 106 by using the top portion of the gripping controller 102, 104 to frictionally grip a front of the device 106 and by using the bottom portion of the gripping controller 102, 104 to frictionally grip a back of the device 106.

In various embodiments, the top portion of each gripping controller 102, 104 may have a face 204, 254 comprising at least one input mechanism such as an input controller 206, 256, for example. The input controller 206, 256 may be a control stick, a plurality of control buttons, a directional pad, or other input that may be particularly adapted for actuation by human hands and more particularly may be adapted for actuation by human thumbs. In some embodiments, ergonomically designed input mechanisms may be provided. Each input controller 206, 256 may receive input from a user. The received input may be button presses from a button or angle and direction from a control stick or other input corresponding to the type of the controller that is provided.

Each gripping controller 102, 104 may also include at least one radio antenna or other receiver/transmitter located in at least one of the top portion and the bottom portion. In various embodiments, the gripping controller 102, 104 may communicate with the portable computing device 106 via the radio antenna using a wireless communications protocol, such as Bluetooth® or Wi-Fi®. In various embodiments, the gripping controller 102, 104 may communicate with the other gripping controller 104, 102 via the radio antenna using a wireless communications protocol, such as Bluetooth® or Wi-Fi®.

In various embodiments, each gripping controller 102, 104 may receive input from a user via the input controllers 206, 256. Each gripping controller 102, 104 may then transmit the received input to the portable computing device 106 via its radio antenna using a wireless communications protocol, such as Bluetooth® or Wi-Fi®. By using the gripping controllers 102, 104 in this way, the user can hold the portable computing device 106 while at the same time using the input controllers 206, 256 to interact with the portable computing device 106.

Each gripping controller 102, 104 may be customized for a particular brand and/or model of portable computing device 106, such as an iPad®, an iPhone®, a Samsung Galaxy Tab, Kindle Fire, Kindle Fire HD, or Samsung Galaxy S®. The controllers may be customized for still other brands. The customization may allow the customized gripping controller 102, 104 to clamp onto and grip the front of a side 108, 109 of the portable computing device 106 without obstructing the screen 110 of the portable computing device 106.

The face 204, 254 of a customized gripping controller 102, 104 may optionally include a slit 220, 270 allowing a user to access at least one communications device of the portable computing device 106 when the customized gripping controller 102, 104 clamps a side 108, 109 of the portable computing device 106. The communications device may be a button, a microphone, a speaker, a camera, a touch-sensitive portion, etc. While this feature has been described as a slit 220, 270, it may have one of several different shapes including a round, square, triangular, or other rather undefined shape. In some embodiments, the slit 220, 270 may be particularly adapted or customized to align with a feature in a particular position on the computing device 106 and may be adapted for a particular brand, for example.

Figure 1B:
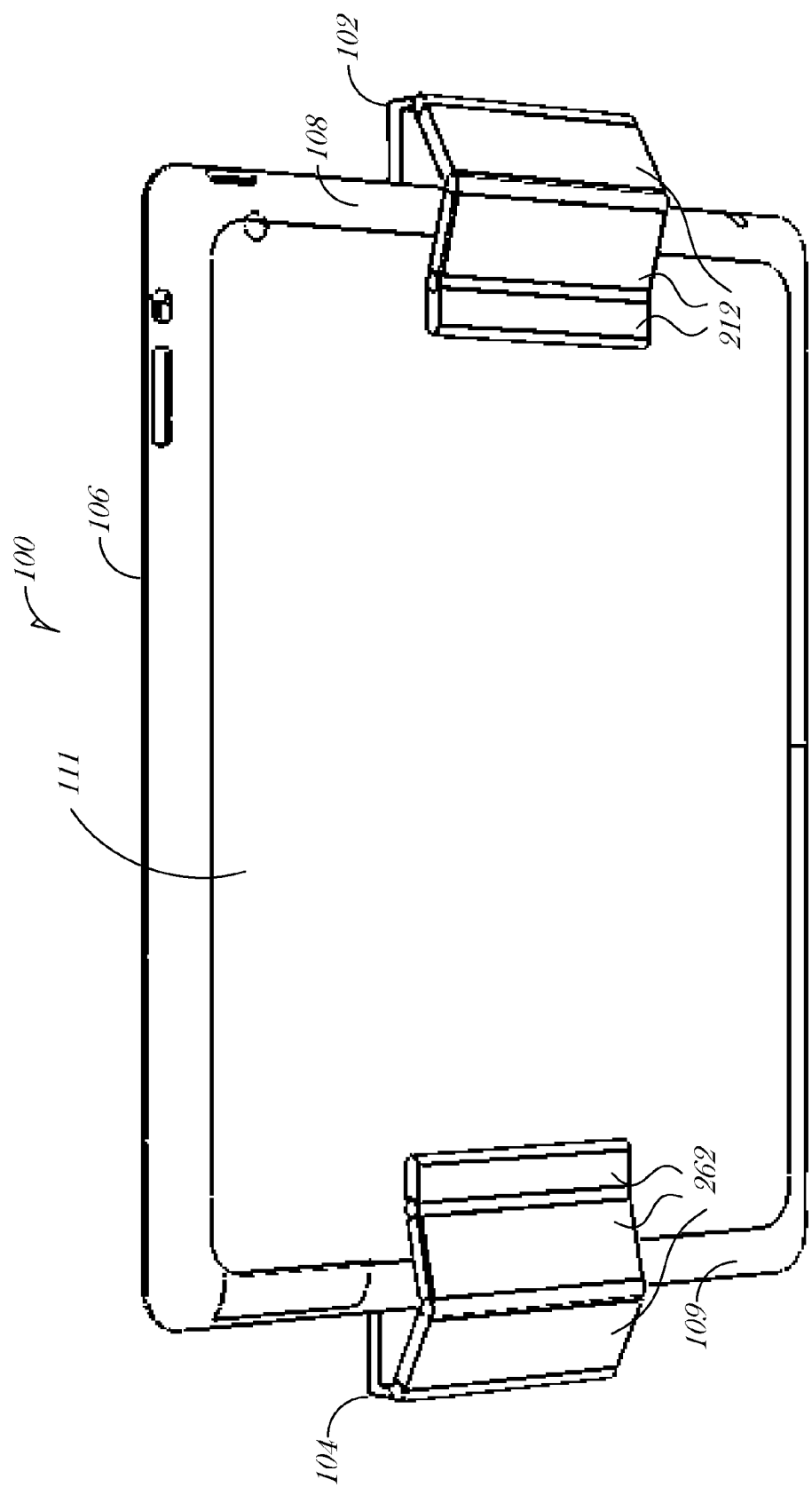
FIG. 1B is a perspective rear view of a system for gripping controllers for portable computing devices, in accordance with some embodiments.

FIG. 1B is a perspective rear view of a system 100 for gripping controllers for portable computing devices, in accordance with some embodiments. One or more bottom portions 212, 262 of gripping controllers 102, 104 may be arranged to frictionally grip a portion of the back of a side 108, 109 of portable computing device 106.

Each gripping controller 102, 104 may be customized for a particular brand and/or model of portable computing device 106, such as an iPad®, an iPhone®, a Samsung Galaxy Tab, Kindle Fire, Kindle Fire HD, Samsung Galaxy S®, etc. The customization may allow the customized gripping controller 102, 104 to clamp onto and grip a portion of the back of a side 108, 109 of the portable computing device 106 without obstructing a communications device on the back 111 or side 108, 109 of the portable computing device 106. The communications device may be a button, a microphone, a speaker, a camera, a touch-sensitive portion, etc.

Although the descriptions of FIGS. 1A & 1B describe using the gripping controllers 102, 104 with the portable computing device 106 to play video games, other uses are possible, such as to use the input controllers 206, 256 of the gripping controllers 102, 104 to draw, to select, or to otherwise input data into the portable computing device 106. Still other uses may be for word processing, texting, e-mailing, or otherwise interacting with the computing device with controllers 102, 104 that may make the device more usable and/or ergonomic, for example.

Figure 2A:
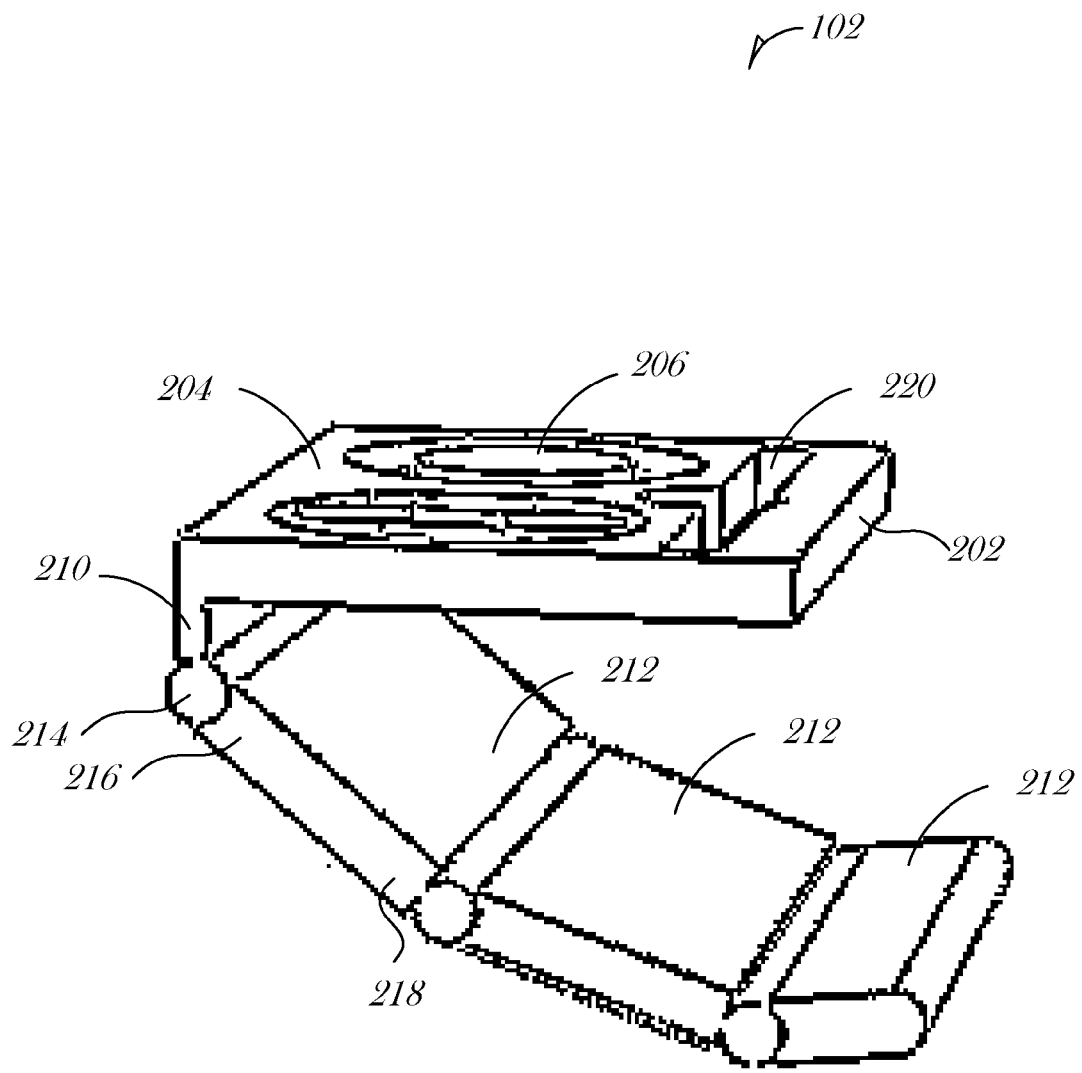
FIG. 2A is a relatively close-up perspective view of the gripping controller previously shown in FIGS. 1A and 1B.

FIG. 2A is a relatively close-up perspective view of the gripping controller 102 previously shown in FIGS. 1A and 1B. Gripping controller 102 may include a top portion 202 and one or more bottom portions 212. Gripping controller 102 may have a shape similar to the letter "C." In various embodiments, the top portion 202 of gripping controller 102 may have a small right angle protrusion 210 to one side. The bottom portion 212 may be coupled to the protrusion 210, such as with a hinge 214. Together, the top portion 202 and bottom portion 212 may function like a clip and grip the top and bottom of a portable computing device 106. In some embodiments, the hinge 214 may include an internal spring or other biasing mechanism tending to force the top portion 102 and the bottom portion 212 toward one another so as to squeeze the computing device 106 therebetween. In some embodiments, the controllers 102, 104 may include gripping surfaces arranged thereon for gripping the surface of the computing device 106. The gripping surfaces may include rubber or other elastomeric pads, hook and loop systems, or other systems.

The top portion 202 may have a face 204, which may include at least one input controller 206 or other type of controller. The input controller 206 may be a control stick, a plurality of control buttons, a directional pad, etc. The input controller 206 may receive input from a user. The received input may be button presses from a button or angle and direction from a control stick or other input corresponding to the type of controller provided.

The face 204 may optionally contain a slit 220 or other shaped opening that allows a user to access at least one communications device of the portable computing device 106 when the gripping controller 102 clamps a side 108 of the portable computing device 106. The communications device may be a button, a microphone, a speaker, a camera, a touch-sensitive portion, etc.

The bottom portion 212 may comprise a plurality of planar portions coupled together in a series. Each of the planar portions in the series may include a proximal end 216 and a distal end 218. The proximal end 216 of a first planar portion 212 of the plurality may be coupled to the top portion 202, such as with a hinge 214. The proximal end 216 of each subsequent planar portion 212 in the series may be coupled to the distal end 218 of the planar portion 212 previous in the series also with a hinge. As such, the bottom portion may be articulable about each of the respective hinges to suitably engage the back side of the computing device. In some embodiments, the hinges may be biased hinges or the hinges may be friction fit hinges that may substantially hold their position after being arranged.

In various embodiments, the gripping controller 102 may optionally comprise feedback devices, such as speakers, lights, displays, or tactile outputs. In such embodiments, the radio antenna of the gripping controller 102 may receive data from the portable computing device 106 and transmit that data to one or more feedback devices for output to a user. In other embodiments, the feedback devices may be responsive to button presses or other interaction with the controller 102.

In various embodiments, the gripping controller 102 may have a battery compartment in the top portion 202, the bottom portion 212, or both. One or more batteries may be inserted into a battery compartment. A battery inserted into a battery compartment may be used to power the input controllers, the radio antenna, an output device, or some combination thereof.

Figure 2B:
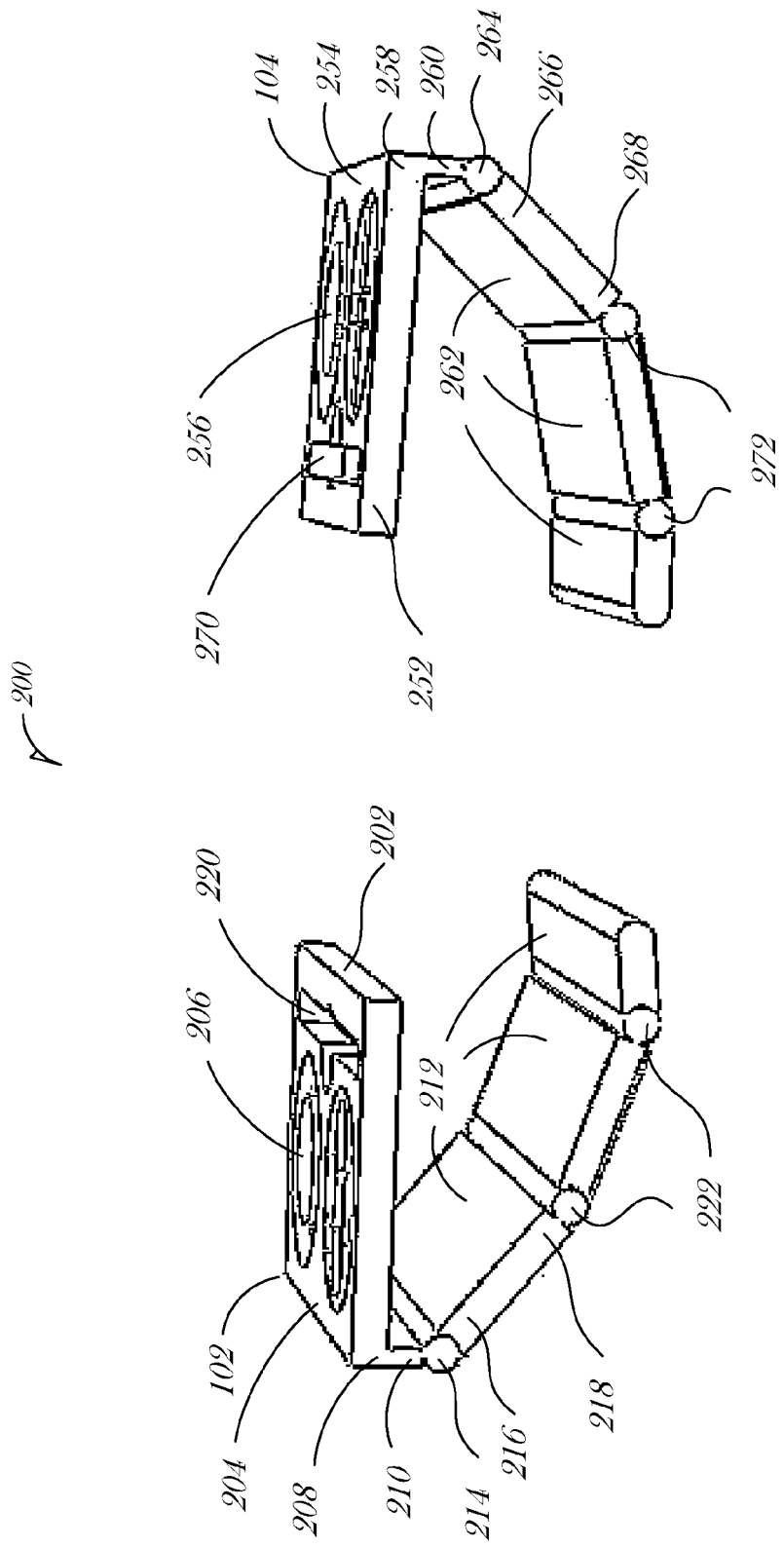
FIG. 2B is a schematic diagram illustrating a wireless system comprising gripping controllers for use with portable computing devices, in accordance with some embodiments.

FIG. 2B is a schematic diagram illustrating a wireless system 200 comprising gripping controllers for use with portable computing devices, in accordance with some embodiments.

In various embodiments, gripping controllers 102, 104 may be mirror images of each other, each having the same input controllers arranged in the same way as the other gripping controller 104, 102. For example, each gripping controller 102, 104 may have a directional pad at the top of its face 204, 254 and a control stick at the bottom of its face 204, 254.

In various embodiments, gripping controllers 102 and 104 may differ from one another in various ways, including the number, type, and arrangement of input controllers, slits, and output devices. For example, gripping controller 102 may have a directional pad at the top of its face 204, a control stick at the bottom of its face 204, and no slit 220 in its face 204, while gripping controller 104 has a diamond array of buttons at the top of its face 254, a control stick at the bottom of its face 254, and a slit 270 in its face 254.

Figure 3:
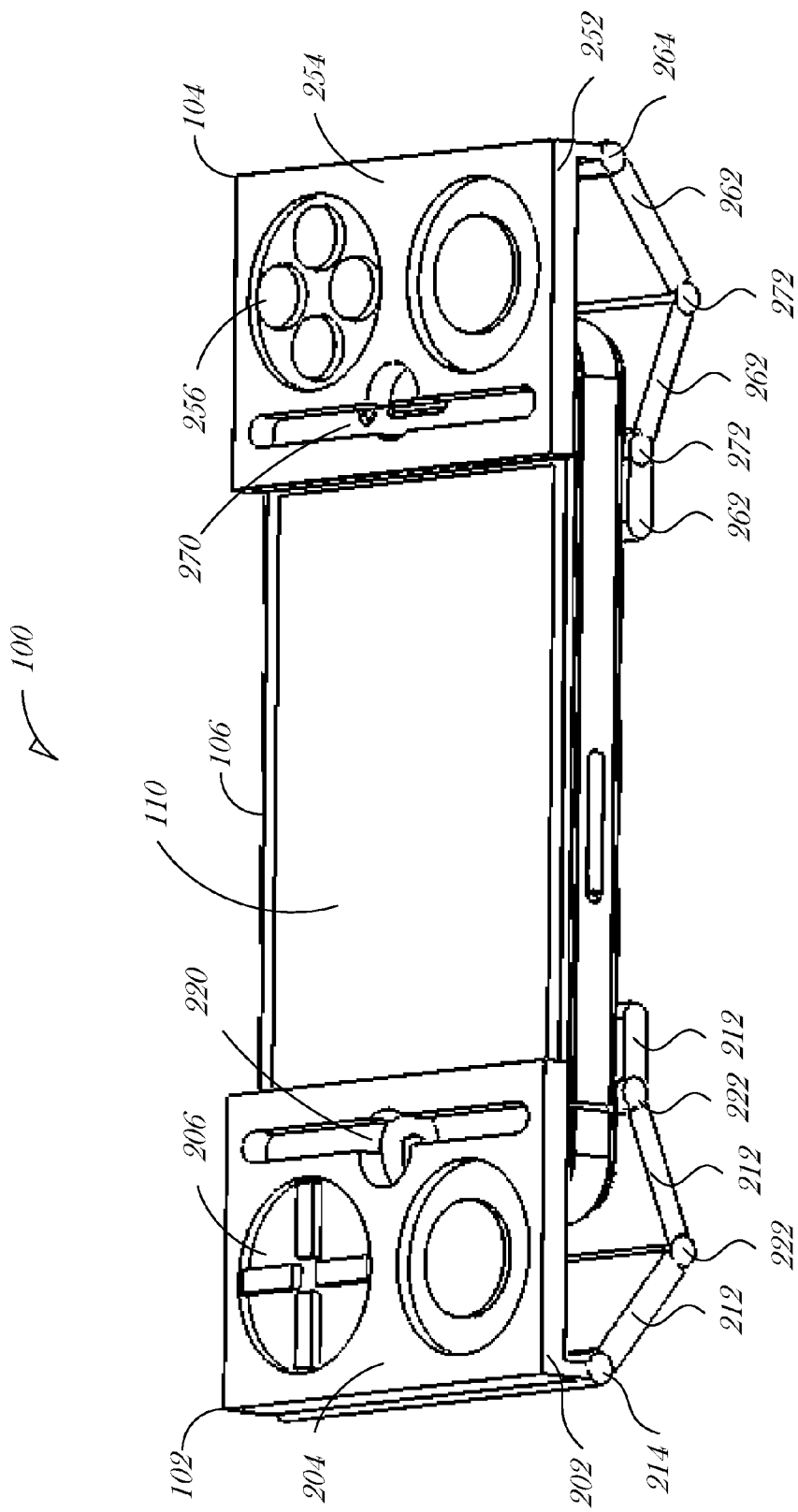
FIG. 3 is a diagram illustrating a perspective of a system for gripping controllers for use with portable computing devices, in accordance with some embodiments.

FIG. 3 is a diagram illustrating a perspective of a system 100 for gripping controllers for use with portable computing devices, in accordance with some embodiments. In the illustrated embodiment, the gripping controllers 102, 104 are clamped onto a smart phone 106.

Figure 4:
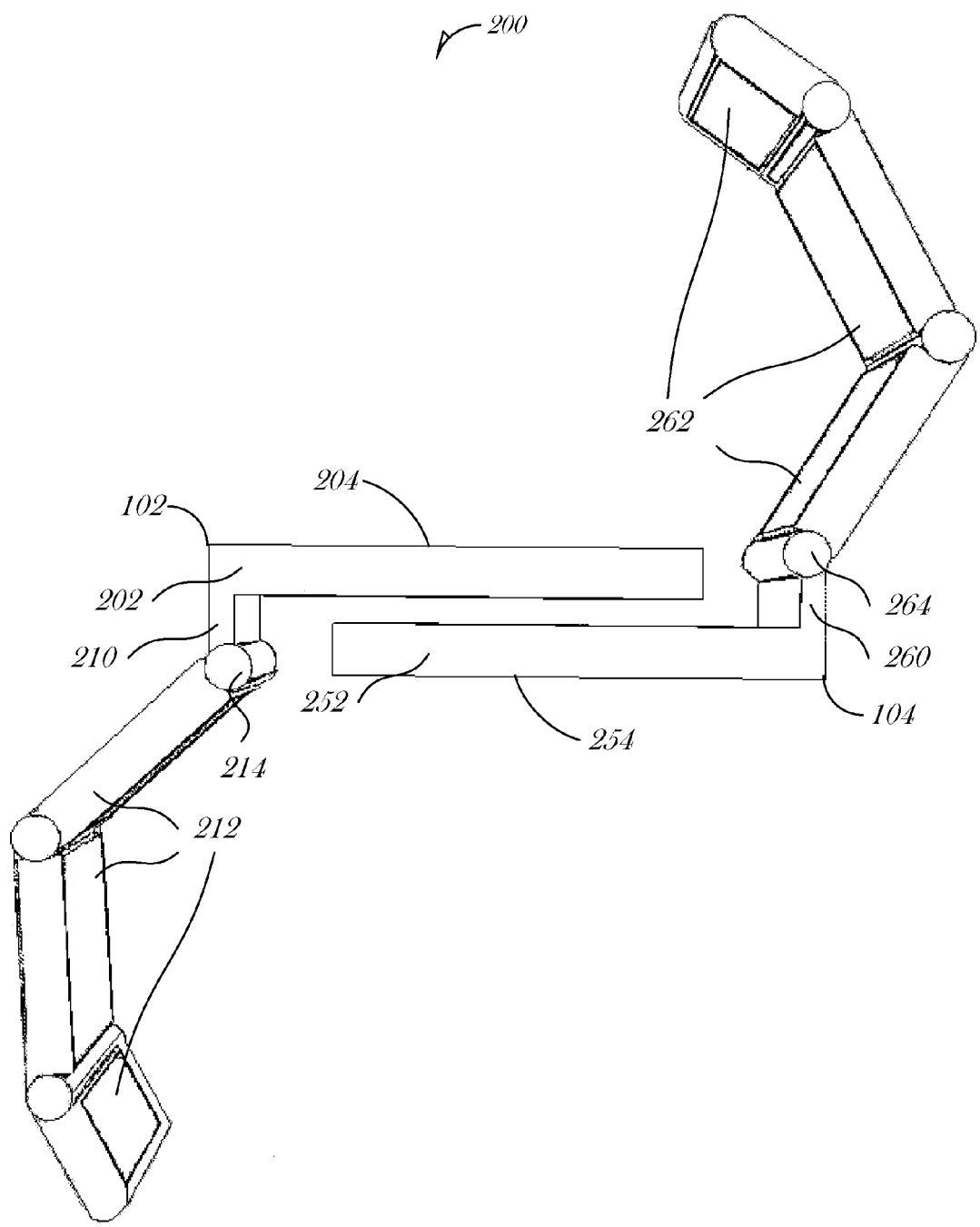
FIG. 4 is a diagram illustrating partially folded wireless system, in accordance with some embodiments.

FIG. 4 is a diagram illustrating partially folded wireless system 200, in accordance with some embodiments. The system 200 includes gripping controllers 102, 104 for use with portable computing devices, in accordance with some embodiments. In various embodiments, gripping controllers 102 and 104 may be folded into one another. A user may wish to fold the gripping controllers 102 and 104 into one another for travelling, for storage, or simply for protection of the gripping controllers 102, 104.

The gripping controllers 102 and 104 may be arranged to fold into one another by first rotating one of the gripping controllers 104, 102 through an angle of approximately 180 degrees along its vertical axis, so that the face 254, 204 of the rotated gripping controller 104, 102 is facing 180 degrees opposite the direction of the face 204, 254 of the non-rotated gripping controller 102, 104. This is the arrangement illustrated in FIG. 4.

Next, the top portions 202, 252 of the gripping controllers 102, 104 may be pressed together. The bottom portions 212, 262 of each gripping controller 102, 104 may then be folded around the face 254, 204 of the other gripping controller 104, 102.

In various embodiments, the bottom portion 212, 262 of a gripping controller 102, 104 may contain multiple planar portions coupled in a series. In such embodiments, the distal end of the last planar portion of the bottom portion 212, 262 may then be rotated towards the top portion 202, 252 so that the distal end of the last planar portion of the bottom portion 212, 262 perpendicularly intersects the plane of the top portion 202, 252. This is the arrangement illustrated in FIG. 5.

Figure 5:
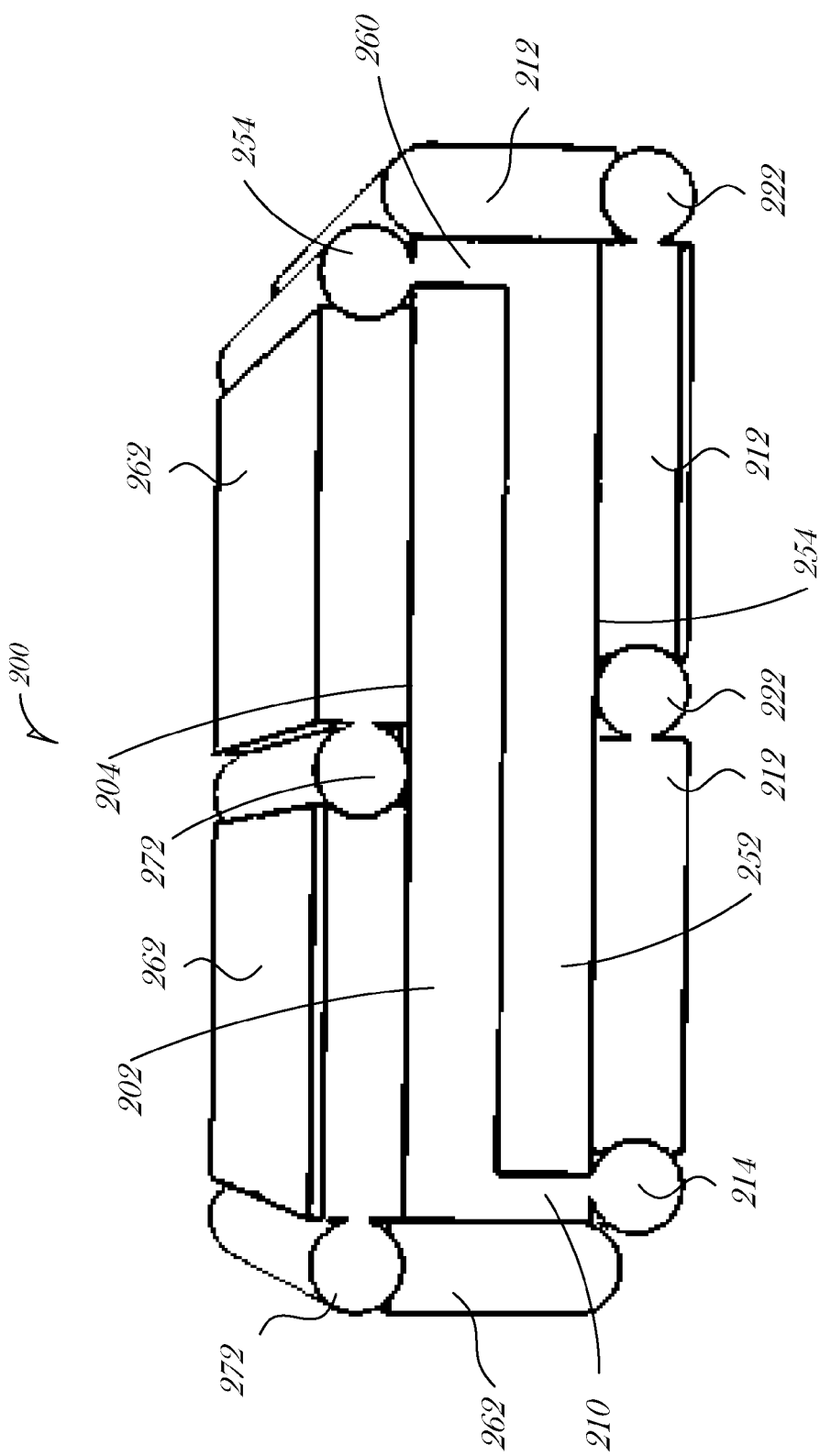
FIG. 5 is a diagram illustrating completely folded wireless system comprising gripping controllers for use with portable computing devices, in accordance with some embodiments.

FIG. 5 is a diagram illustrating completely folded wireless system 200 comprising gripping controllers for use with portable computing devices, in accordance with some embodiments. In various embodiments, the wireless system 200 may be kept folded together by magnetic fields emanating from magnets in the bottom portions 212, 262 and in the right angle protrusions 210, 260 of top portions 202, 252. In various embodiments, the wireless system 200 may be kept folded together by the force of hinges 214, 222, 254, 272.

Figure 6:
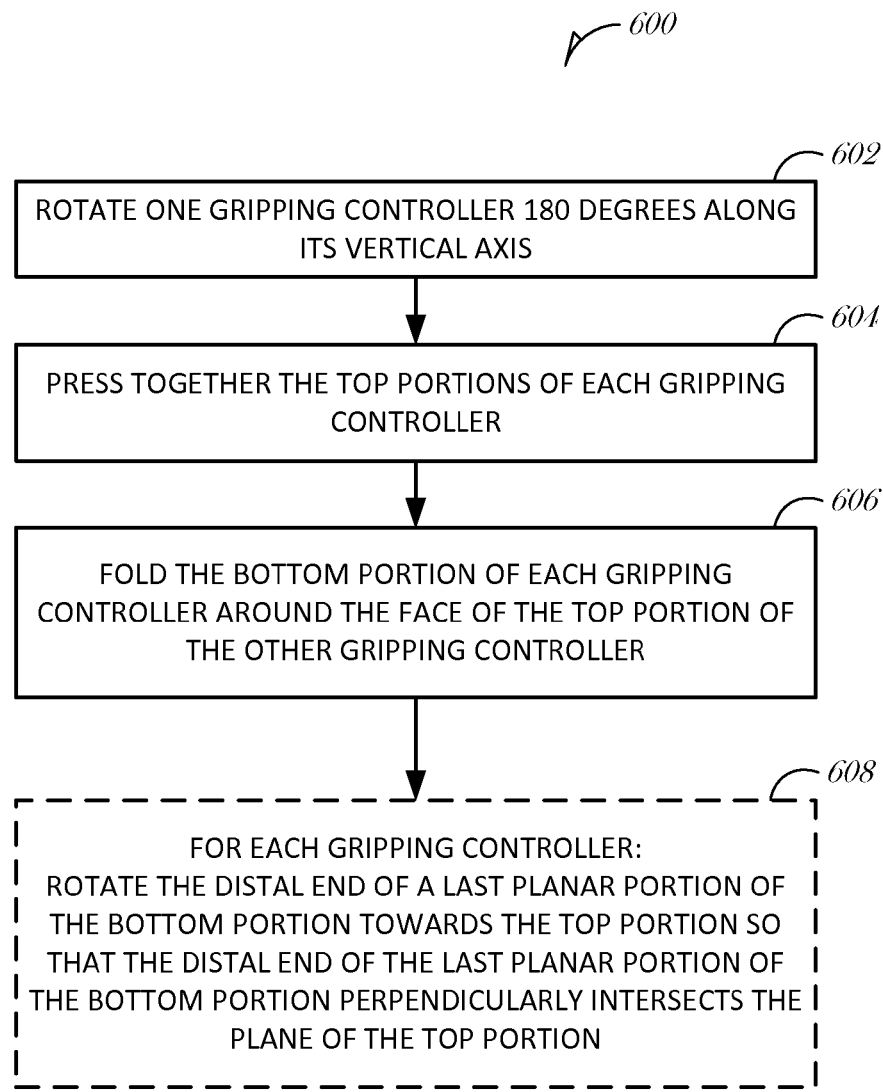
FIG. 6 is a flowchart illustrating a method for nesting together two gripping controllers for use with portable computing devices, in accordance with some embodiments.

FIG. 6 is a flowchart illustrating a method 600 for nesting together two gripping controllers for use with portable computing devices, in accordance with some embodiments.

At 602, one of the two gripping controllers 102, 104 may be rotated 180 degrees along its vertical axis.

At 604, the top portions 202, 252 of each gripping controller 102, 104 may be pressed together.

At 606, the bottom portions 212, 262 of each gripping controller 102, 104 may be folded around the face of the top portion 252, 202 of the other gripping controller 104, 102.

At 608, optionally, for each gripping controller 102, 104, the distal end of the last planar portion of the bottom portion 212, 262 may be rotated towards the top portion 202, 252 so that the distal end of the last planar portion of the bottom portion 212, 262 perpendicularly intersects the plane of the top portion 202, 252.

Figure 7:
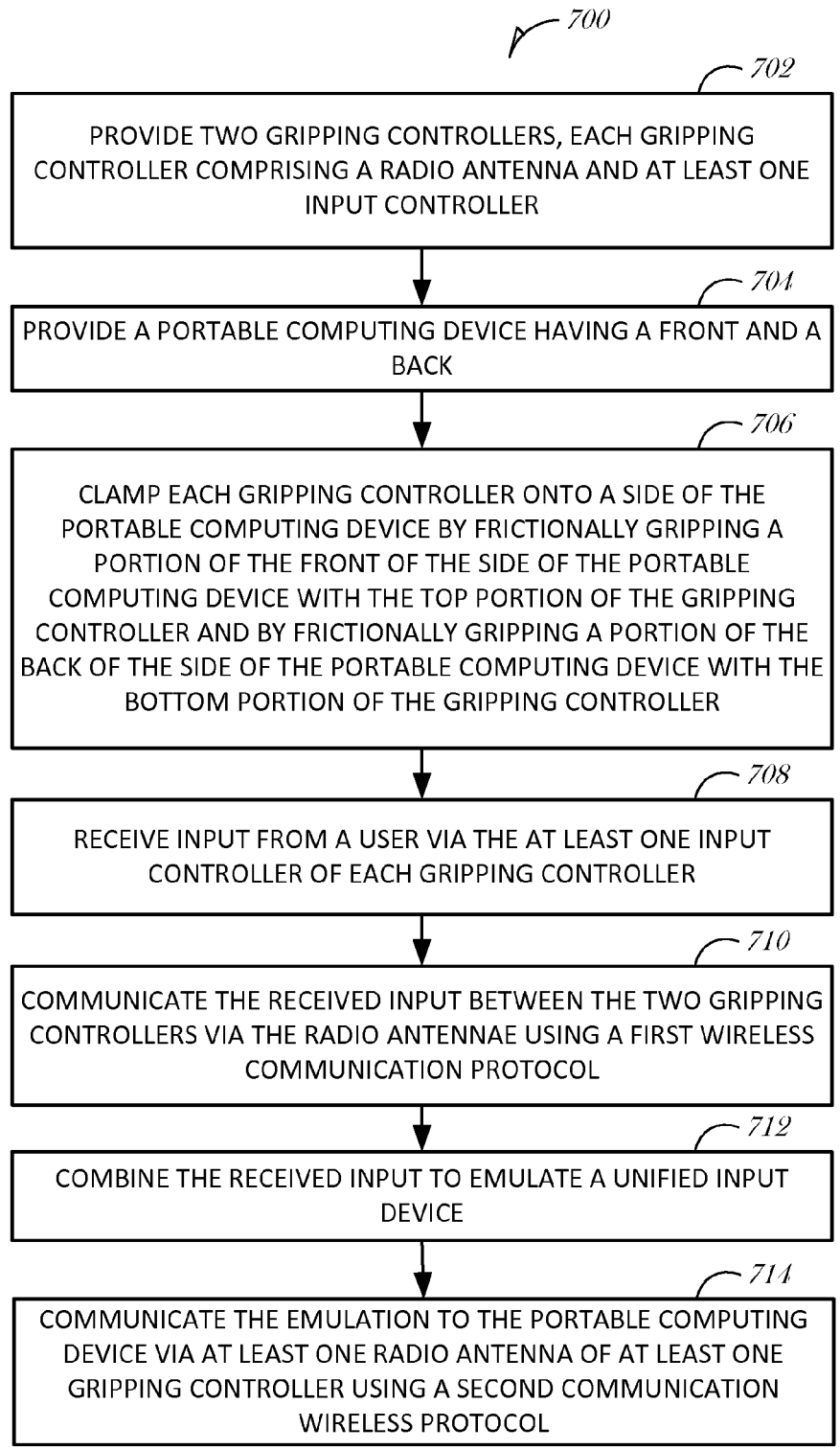
FIG. 7 is a flowchart illustrating a method for using two gripping controllers for use with portable computing devices to emulate a unified wireless input device to a portable computing device, in accordance with some embodiments.

FIG. 7 is a flowchart illustrating a method 700 for using two gripping controllers 102, 104 for use with portable computing devices to emulate a unified wireless input device to a portable computing device 106, in accordance with some embodiments.

At 702, two gripping controllers 102, 104 are provided, each gripping controller 102, 104 comprising a radio antenna and at least one input controller 206, 256.

At 704, a portable computing device 106 having a front and a back is provided.

At 706, each gripping controller 102, 104 may be clamped onto a side 108, 109 of the portable computing device 106 by frictionally gripping a portion of the front of a side 108, 109 of the portable computing device 106 with the top portion 202, 252 of the gripping controller 102, 104 and by frictionally gripping a portion of the back of a side 108, 109 of the portable computing device with the bottom portion 212, 262 of the gripping controller 102, 104.

At 708, input may be received from a user via the at least one input controller 206, 256 of each gripping controller 102, 104.

At 710, the received input may be communicated between the two gripping controllers 102, 104 via the radio antennae using a first wireless communication protocol.

At 712, the received input may be combined to emulate a unified input device.

At 714, the emulation may be communicated to the portable computing device 106 via at least one radio antenna of at least one gripping controller 102, 104 using a second communication wireless protocol.

Figure 8:
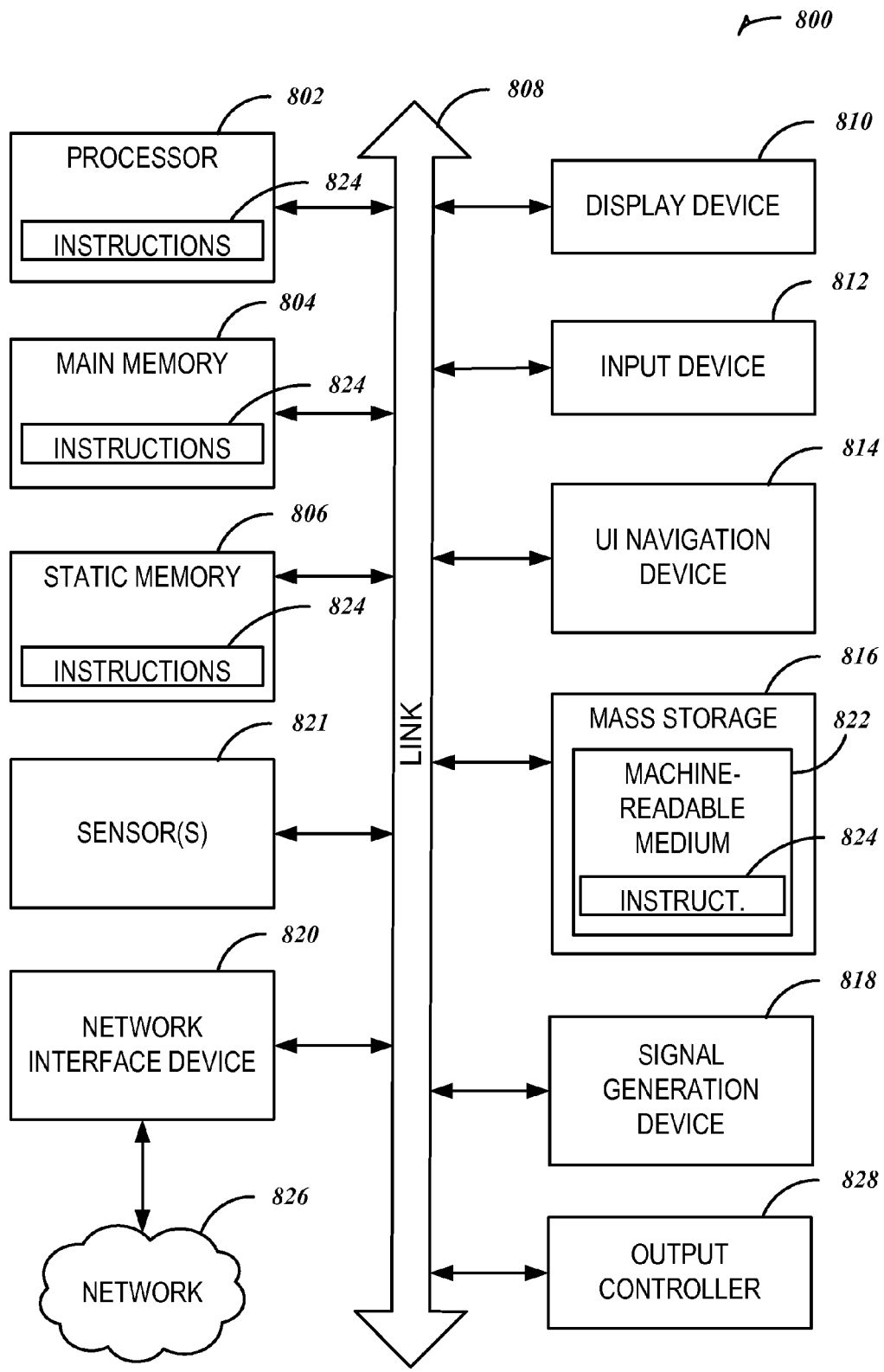
FIG. 8 illustrates a functional block diagram of an example wireless system, in accordance with some embodiments, upon which any one or more of the techniques (e.g., methodologies) discussed herein can perform.

FIG. 8 illustrates a functional block diagram of an example wireless system 800, in accordance with some embodiments, upon which any one or more of the techniques (e.g., methodologies) discussed herein can perform. In alternative embodiments, the wireless system 800 can operate as a standalone device or can be connected (e.g., networked) to other machines. In a networked deployment, the wireless system 800 can operate in the capacity of a server machine, a client machine, or both in server-client network environments. In an example, the wireless system 800 can act as a peer machine in peer-to-peer (P2P) (or other distributed) network environment. Further, although only a single wireless system 800 is illustrated, the term "wireless system" shall also be taken to include any collection of wireless systems that individually or jointly execute a set (or multiple sets) of instructions to perform any one or more of the methodologies discussed herein, such as cloud computing, software as a service (SaaS), other computer cluster configurations.

Examples, as described herein, can include, or can operate on, logic or a number of components, modules, or mechanisms. Modules are tangible entities capable of performing specified operations and can be configured or arranged in a certain manner. In an example, circuits can be arranged (e.g., internally or with respect to external entities such as other circuits) in a specified manner as a module. In an example, the whole or part of one or more computer systems (e.g., a standalone, client or server computer system) or one or more hardware processors can be configured by firmware or software (e.g., instructions, an application portion, or an application) as a module that operates to perform specified operations. In an example, the software can reside (1) on a non-transitory machine-readable medium or (2) in a transmission signal. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor can be configured as respective different modules at different times. Software can accordingly configure a hardware processor, for example, to constitute a particular module at one instance of time and to constitute a different module at a different instance of time.

Wireless system 800 can include a hardware processor 802 (e.g., a central processing unit (CPU), a graphics processing unit (GPU), a hardware processor core, or any combination thereof), a main memory 804 and a static memory 806, some or all of which can communicate with each other via a link 808. The wireless system 800 can further include a display unit 810, an alphanumeric input device 812 (e.g., buttons), and a user interface (UI) navigation device 814 (e.g., a control stick or trackball). In an example, the display unit 810, input device 812 and UI navigation device 814 can be a touch screen display. The wireless system 800 can additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The wireless system 800 can include an output controller 828, such as a serial (e.g., universal serial bus (USB), parallel, or other wired or wireless (e.g., infrared (IR)) connection to communicate or control one or more peripheral devices (e.g., a printer, card reader, etc.)

The storage device 816 can include a machine-readable medium 822 on which is stored one or more sets of data structures or instructions 824 (e.g., software) embodying or utilized by any one or more of the techniques or functions described herein. The instructions 824 can also reside, completely or at least partially, within the main memory 804, within static memory 806, or within the hardware processor 802 during execution thereof by the wireless system 800. In an example, one or any combination of the hardware processor 802, the main memory 804, the static memory 806, or the storage device 816 can constitute machine-readable media.

Although the machine-readable medium 822 is illustrated as a single medium, the term "machine-readable medium" can include a single medium or multiple media (e.g., a centralized or distributed database, and/or associated caches and servers) that configured to store the one or more instructions 824.

The term "machine-readable medium" can include any tangible medium that is capable of storing, encoding, or carrying instructions for execution by the wireless system 800 and that cause the wireless system 800 to perform any one or more of the techniques of the present disclosure, or that is capable of storing, encoding or carrying data structures used by or associated with such instructions. Non-limiting machine-readable medium examples can include solid-state memories, and optical and magnetic media. Specific examples of machine-readable media can include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; and magneto-optical disks.

The instructions 824 can further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi, IEEE 802.16 family of standards known as WiMax®), peer-to-peer (P2P) networks, among others. In an example, the network interface device 820 can include one or more antennas to connect to the communications network 826. In an example, the network interface device 820 can include a plurality of antennas to communicate wirelessly using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the wireless system 800, and includes digital or analog communications signals or other intangible medium to facilitate communication of such software.

Although example wireless system 800 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of system 800 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, system 800 may include one or more processors and may be configured with instructions stored on a computer-readable storage device.

ADDITIONAL NOTES & EXAMPLES

The following examples pertain to further embodiments.

Example 1 may include subject matter (such as a system, apparatus, or wireless input device for use with portable computing devices) comprising a top portion having a face, the face comprising at least one input controller arranged to receive input from a user; a bottom portion coupled to the top portion; and a radio antenna located in at least one of the top portion and the bottom portion, the radio antenna arranged for wireless communications. The subject matter of Example 1 may also include a portable computing device that has a front and a back. The subject matter of Example 1 may also include the wireless input device arranged to clamp onto a side of the portable computing device by using the top portion of the wireless input device to frictionally grip a portion of the front of the portable computing device and by using the bottom portion of the wireless input device to frictionally grip a portion of the back of the portable computing device. The subject matter of Example 1 may also include the wireless input device arranged to communicate the received input to the portable computing device via the radio antenna using a wireless communication protocol.

In Example 2, the subject matter of Example 1 may optionally include the portable computing device as one of a tablet computer, a smartphone, a laptop computer, a netbook computer, a notebook computer, or a media player.

In Example 3, the subject matter of any of Examples 1-2 may optionally include the at least one input controller as one of an control stick, a plurality of control buttons, or a directional pad.

In Example 4, the subject matter of any of Examples 1-3 may optionally include the face of the top portion comprising at least one slit. The subject matter of Example 4 may also include the at least one slit arranged to allow a user access to at least one communications device of the portable computing device when the wireless input device clamps a side of the portable computing device.

In Example 5, the subject matter of any of Examples 1-4 may optionally include the wireless communication protocol as at least one of Bluetooth or Wi-Fi.

In Example 6, the subject matter of any of Examples 1-5 may optionally include the bottom portion further comprising a plurality of planar portions in a series, each planar portion in the series comprising a proximal end and a distal end. The subject matter of Example 6 may further comprise the proximal end of a first planar portion of the plurality coupled to the top portion. The subject matter of Example 6 may further comprise the proximal end of each subsequent planar portion in the series coupled to the distal end of the planar portion previous in the series.

In Example 7, the subject matter of any of Examples 1-6 may optionally include the wireless input device arranged to fold upon itself by rotating the bottom portion underneath the top portion so that the bottom portion is parallel with the top portion; and rotating the distal end of a last planar portion of the bottom portion towards the top portion so that the distal end of the last planar portion of the bottom portion perpendicularly intersects the plane of the top portion.

In Example 8, the subject matter of any of Examples 1-7 may optionally include the top portion and bottom portion coupled together with a hinge.

Example 9 may include, or may optionally be combined with the subject matter of any one of Examples 1-8 to include, subject matter (such as a method, means for performing acts, or machine readable medium including instructions that, when performed by a machine cause the machine to performs acts) comprising providing two wireless input devices, each wireless input device comprising a radio antenna and at least one input controller. The subject matter of Example 9 may further comprise providing a portable computing device having a front and a back. The subject matter of Example 9 may further comprise clamping each wireless input device onto a side of the portable computing device by frictionally gripping a portion of the front of the portable computing device with the top portion of the wireless input device and by frictionally gripping a portion of the back of the portable computing device with the bottom portion of the wireless input device. The subject matter of Example 9 may further comprise receiving input from a user via the at least one input controller of each wireless input device. The subject matter of Example 9 may further comprise communicating the received input between the two wireless input devices via the radio antennae using a first wireless communication protocol. The subject matter of Example 9 may further comprise combining the received input to emulate a unified input device. The subject matter of Example 9 may further comprise communicating the emulation to the portable computing device via at least one radio antenna of at least one wireless input device using a second communication wireless protocol.

In Example 10, the subject matter of any of Examples 1-9 may optionally include each of the first wireless communication protocol and the second wireless protocol as at least one of Bluetooth or Wi-Fi.

In Example 11, the subject matter of any of Examples 1-10 may optionally include nesting together the two wireless input devices by rotating one wireless input device 180 degrees along its vertical axis; pressing together the top portions of each wireless input device; and folding the bottom portion of each wireless input device around the face of the top portion of the other wireless input device.

Example 12 may include, or may optionally be combined with the subject matter of any one of Examples 1-11 to include, subject matter (such as a wireless system, apparatus, or device for use with portable computing devices) comprising two wireless input devices. The subject matter of Example 12 may further comprise each wireless input device comprising a top portion having a face, the face comprising at least one input controller arranged to receive input from a user. The subject matter of Example 12 may further comprise each wireless input device comprising a bottom portion coupled to the top portion; and a radio antenna located in at least one of the top portion and the bottom portion, the radio antenna arranged for wireless communications. The subject matter of Example 12 may further comprise a portable computing device having a front and a back. The subject matter of Example 12 may further comprise each wireless input device arranged to clamp onto a side of the portable computing device by using the top portion of the wireless input device to frictionally grip a portion of the front of the portable computing device and by using the bottom portion of the wireless input device to frictionally grip a portion of the back of the portable computing device. The subject matter of Example 12 may further comprise at least one wireless input device arranged to communicate the received input to the portable computing device via the radio antenna of the at least one wireless input device using a first wireless communication protocol.

In Example 13, the subject matter of any of Examples 1-12 may optionally include the portable computing device as one of a tablet computer, a smartphone, a laptop computer, a netbook computer, a notebook computer, or a media player.

In Example 14, the subject matter of any of Examples 1-13 may optionally include the at least one input controller as one of a control stick, a plurality of control buttons, or a directional pad.

In Example 15, the subject matter of any of Examples 1-14 may optionally include each wireless input device arranged to communicate with the other wireless input device via its radio antenna using a second wireless communication protocol.

In Example 16, the subject matter of any of Examples 1-15 may optionally include the two wireless input devices arranged to combine input received from the user by the at least one input controller of each wireless input device to emulate a unified input device to the portable computing device via at least one radio antenna of at least one wireless input device using a second wireless communication protocol.

In Example 17, the subject matter of any of Examples 1-16 may optionally include each of the first wireless communication protocol and the second wireless protocol as at least one of Bluetooth or Wi-Fi.

In Example 18, the subject matter of any of Examples 1-17 may optionally include the bottom portion of each wireless input device further comprising a plurality of planar portions in a series, each planar portion in the series comprising a proximal end and a distal end. The subject matter of Example 18 may further comprise the proximal end of a first planar portion of the plurality coupled to the top portion. The subject matter of Example 18 may further comprise the proximal end of each subsequent planar portion in the series coupled to the distal end of the planar portion previous in the series.

In Example 19, the subject matter of any of Examples 1-18 may optionally include the two wireless input devices arranged to nest together by rotating one wireless input device 180 degrees along its vertical axis; pressing together the top portions of each wireless input device; and folding the bottom portion of each wireless input device around the face of the top portion of the other wireless input device. The subject matter of Example 19 may further comprise, for each wireless input device, rotating the distal end of a last planar portion of the bottom portion towards the top portion so that the distal end of the last planar portion of the bottom portion perpendicularly intersects the plane of the top portion.

In Example 20, the subject matter of any of Examples 1-19 may optionally include the top portion and bottom portion coupled together with a hinge.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A wireless input device for use with a portable computing device, the wireless input device comprising:
   a top portion having a face, the face comprising at least one analog input controller arranged to receive analog input from a user;
   a bottom portion coupled to the top portion comprising:
   a plurality of planar portions in a series, each planar portion in the series comprising a proximal end and a distal end;
   the proximal end of a first planar portion of the plurality coupled to the top portion; and
   the proximal end of each subsequent planar portion in the series coupled to the distal end of the planar portion previous in the series; and
   a radio antenna located in at least one of the top portion and the bottom portion, the radio antenna arranged for wireless communications;
   wherein the portable computing device has a front and a back;
   wherein the wireless input device is arranged to clamp onto a side of the portable computing device by using the top portion of the wireless input device to frictionally grip a portion of the front of the portable computing device and by using the bottom portion of the wireless input device to frictionally grip a portion of the back of the portable computing device;
   wherein the wireless input device is configured to allow it to adjust to the thickness of the portable computing device;
   wherein the wireless input device is arranged to fold upon itself by:
   rotating the bottom portion underneath the top portion so that the bottom portion is parallel with the top portion; and
   rotating the distal end of a last planar portion of the bottom portion towards the top portion so that the distal end of the last planar portion of the bottom portion perpendicularly intersects the plane of the top portion; and
   wherein the wireless input device is arranged to communicate the received analog input to the portable computing device via the radio antenna using a wireless communication protocol.

2. The wireless input device of claim 1, wherein the portable computing device is one of a tablet computer, a smartphone, a laptop computer, a netbook computer, a notebook computer, or a media player.

3. The wireless input device of claim 1, wherein the at least one analog input controller is one of an analog control stick, a plurality of control buttons, or a directional pad.

4. The wireless input device of claim 1,
   wherein the face of the top portion comprises at least one slit; and
   wherein the at least one slit is arranged to allow a user access to at least one communications device of the portable computing device when the wireless input device clamps a side of the portable computing device.

5. The wireless input device of claim 1, wherein the wireless communication protocol is at least one of Bluetooth or Wi-Fi.

6. The wireless input device of claim 1, wherein the top portion and bottom portion are coupled together with a hinge.

7. A method of emulating a unified analog wireless input device with two wireless input devices, wherein the wireless input devices each comprise:
   a radio antenna; and
   at least one analog input controller, the method comprising:
   clamping each wireless input device onto a side of the portable computing device by adjusting the respective wireless input device to the thickness of the portable computer device and frictionally gripping a portion of the front of the portable computing device with the top portion of the respective wireless input device and frictionally gripping a portion of the back of the portable computing device with the bottom portion of the respective wireless input device;

receiving analog input from a user via the at least one analog input controller of each wireless input device;

communicating the received analog input between the two wireless input devices via the radio antennae using a first wireless communication protocol;

combining the received analog input to emulate a unified analog input device;

communicating the emulation to the portable computing device via at least one radio antenna of at least one of the two wireless input devices using a second communication wireless protocol; and nesting together the two wireless input devices by:
- rotating one wireless input device 180 degrees along its vertical axis;
- pressing together the to portions of each wireless input device; and
- folding the bottom portion of each wireless input device around the face of the top portion of the other wireless input device.

8. The method of claim 7, wherein each of the first wireless communication protocol and the second wireless protocol is at least one of Bluetooth or Wi-Fi.

9. A system for use with a portable computing device, the system comprising:

two wireless input devices, each wireless input device comprising:
- a top portion having a face, the face comprising at least one analog input controller arranged to receive analog input from a user;
- a bottom portion coupled to the top portion;

wherein the bottom portion of each wireless input device further comprises:

a plurality of planar portions in a series, each planar portion in the series comprising a proximal end and a distal end;

the proximal end of a first planar portion of the plurality coupled to the top portion; and the proximal end of each subsequent planar portion in the series coupled to the distal end of the planar portion previous in the series; and a radio antenna located in at least one of the top portion and the bottom portion, the radio antenna arranged for wireless communications;

a portable computing device having a front and a back;

wherein each wireless input device is arranged to clamp onto a side of the portable computing device by using the top portion of the wireless input device to frictionally grip a portion of the front of the portable computing device and by using the bottom portion of the wireless input device to frictionally grip a portion of the back of the portable computing device;

wherein each wireless input device is configured to allow it to adjust to the thickness of the portable computing device;

wherein at least one wireless input device is arranged to communicate the received analog input to the portable computing device via the radio antenna of the at least one wireless input device using a first wireless communication protocol; and wherein the two wireless input devices are arranged to nest together by:

rotating one wireless input device 180 degrees along its vertical axis; pressing together the top portions of each wireless input device;

folding the bottom portion of each wireless input device around the face of the top portion of the other wireless input device; and for each wireless input device:

rotating the distal end of a last planar portion of the bottom portion towards the top portion so that the distal end of the last planar portion of the bottom portion perpendicularly intersects the plane of the top portion.

10. The system of claim 9, wherein the portable computing device is one of a tablet computer, a smartphone, a laptop computer, a netbook computer, a notebook computer, or a media player.

11. The system of claim 9, wherein the at least one analog input controller is one of an analog control stick, a plurality of control buttons, or a directional pad.

12. The system of claim 9, wherein each wireless input device is arranged to communicate with the other wireless input device via its radio antenna using a second wireless communication protocol.

13. The system of claim 12, wherein the two wireless input devices are arranged to combine analog input received from the user by the at least one analog input controller of each wireless input device to emulate a unified analog input device to the portable computing device via at least one radio antenna of at least one wireless input device using a second wireless communication protocol.

14. The system of claim 13, wherein each of the first wireless communication protocol and the second wireless protocol is at least one of Bluetooth or Wi-Fi.

15. The system of claim 9, wherein the top portion and bottom portion are coupled together with a hinge.

* * * * *